(12) United States Patent
Tsutsumi

(10) Patent No.: US 9,224,076 B2
(45) Date of Patent: Dec. 29, 2015

(54) IMAGE FORMING APPARATUS, IMAGE FORMATION SYSTEM, AND METHOD FOR CONTROLLING IMAGE FORMING APPARATUS

(71) Applicant: KYOCERA Document Solutions Inc., Chuo-ku, Osaka (JP)

(72) Inventor: Masafumi Tsutsumi, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 14/163,895

(22) Filed: Jan. 24, 2014

(65) Prior Publication Data

US 2014/0211250 A1    Jul. 31, 2014

(30) Foreign Application Priority Data

Jan. 30, 2013    (JP) .................................. 2013-015769

(51) Int. Cl.
*G06F 3/12*    (2006.01)
*G06K 15/02*    (2006.01)
*H04N 1/00*    (2006.01)

(52) U.S. Cl.
CPC ........ *G06K 15/1807* (2013.01); *H04N 1/00127* (2013.01); *H04N 1/00167* (2013.01); *H04N 1/00188* (2013.01)

(58) Field of Classification Search
None
See application file for complete search history.

(56) References Cited

U.S. PATENT DOCUMENTS

| 2007/0133873 A1* | 6/2007 | Aoyagi .......................... 382/176 |
| 2011/0249299 A1* | 10/2011 | Wu et al. ...................... 358/3.26 |
| 2013/0047066 A1* | 2/2013 | Lee ................................ 715/229 |

FOREIGN PATENT DOCUMENTS

JP    2010-003218 A    1/2010

* cited by examiner

*Primary Examiner* — John Wallace
(74) *Attorney, Agent, or Firm* — Stein IP, LLC

(57) ABSTRACT

An image forming apparatus includes: a communication unit for receiving unmodified data and modified data obtained when the unmodified data is modified; an image-reading unit for reading a confirmation document over which commentary has been written, and generating scan data; a storage unit for storing the unmodified data, the modified data, and the scan data; a comparison processing unit for comparing the unmodified data, the modified data, and the scan data, and recognizing confirmation places of the modified data, which are modified places that correspond to the commentary and have been modified from the unmodified data; and a printing unit for printing only those pages of the modified data that comprise the confirmation places recognized by the comparison processing unit.

13 Claims, 7 Drawing Sheets

MODIFIED DATA    UNMODIFIED DATA

SCAN DATA    SCAN DATA    SCAN DATA

IMAGE FORMING APPARATUS, IMAGE FORMATION SYSTEM, AND METHOD FOR CONTROLLING IMAGE FORMING APPARATUS

CROSS-REFERENCE TO RELATED APPLICATIONS

The present application claims the benefit of priority on the basis of Japanese patent application No. 2013-015769, filed on Jan. 30, 2013, the entire contents of which are incorporated herein by reference.

BACKGROUND

The present disclosure relates to an image forming apparatus and image formation system for assisting in a task in which a person confirming confirms a modified document.

In some instances a document that has been authored is viewed and examined (reviewed) by a plurality of confirmers (reviewers) such as supervisors. The confirmers handwrite a commentary (comments) on a printout of the document. Then, in some instances, the content of a document or places where modifications are needed are examined while the commentary from each of the confirmers is collected in a meeting or the like. The document is then modified on the basis of the examination results. In some instances, too, a plurality of confirmers are requested to examine a document, the document is received written over with commentary, and the document author modifies the document, referring to each confirmer's commentary written over the received document. There are known techniques for collecting such commentary from persons other than the document author, and facilitating the task of examining the document in a meeting or facilitating modification of the document.

For example, there is known a document review assistance apparatus including: a document management unit for managing an electronic document under review; a printing unit for printing the electronic document of the document management unit, at which time printing is carried out with information enabling identification of the electronic document having been added; a reading unit for converting a document to which a handwritten comment has been added into image information; a document recognition unit for extracting information for electronic document identification from the image information of the reading unit and identifying the corresponding electronic document of the document management unit; a comment extraction unit for comparing the image information of the corresponding electronic document identified by the document recognition unit and the image information of the reading unit, and extracting a comment by handwritten input and comment information including relational information about the comment and the corresponding electronic document; a comment management unit for managing the extracted comment; a document display unit for displaying together the corresponding electronic document of the document management unit and the comment of the comment management unit; and a comment input unit for inputting a comment to the electronic document being displayed on the document display unit.

The text is modified with reference to each confirmer's commentary and opinion. Then in some cases the confirmers confirm the modified document for whether or not the commented portions have been properly modified. In such a case, the confirmers receive a printout of the modified document, and confirm whether the places of their own commentary have been modified, edited, or the like.

At this time, the confirmers seek out portions (places modified by commentary) corresponding to commented places out of the printout of the modified document, while viewing the unmodified document over which the commentary was earlier written. When the unmodified document over which the commentary was earlier written is not at hand, it is necessary to work from memory in seeking out places modified by their own commentary from the modified document.

However, because modifications and editing are carried out in some instances the modified document may have different lines or a different number of pages from the unmodified document. For this reason, in some instances it is difficult to seek out portions where one had commented from the modified document. In particular in a case where the number of pages in the document spans several tens of pages or several hundred pages, it takes time and effort to seek out and find all places modified by one's own commentary from a modified document spanning a large number of pages. As such, a problem emerges in that it is difficult to readily carry out the task of confirming a modified document.

Here, according to the known art described above, it would be possible to combine the review results of a plurality of reviewers (confirmers). However, it is not possible to simplify the task of confirming a document that has been modified on the basis of the combined review results.

SUMMARY

The present disclosure, in light of the problems of the prior art described above, makes it possible to readily carry out the task of confirming a modified document (printout that has been modified).

In order to solve the above problems, an image forming apparatus as in a first aspect of the present disclosure comprises a communication unit, an image-reading unit, a storage unit, a comparison processing unit, and a printing unit. The communication unit receives electronic data for printing from an external source, and receives unmodified data, which is unmodified electronic data, and modified data, which is electronic data obtained when the unmodified data is modified. The image-reading unit reads a confirmation document, which is a printout based on the unmodified data, the confirmation document being confirmed by a confirmer and being overwritten with commentary, and generates scan data to serve as image data. The storage unit stores the unmodified data, the modified data, and the scan data The comparison processing unit compares the unmodified data, the modified data, and the scan data stored in the storage unit, and recognizes a confirmation place of the modified data, which is a modified place that corresponds to the commentary and has been modified from the unmodified data. The printing unit prints on the basis of the unmodified data and the modified data, and the printing unit printing only a page of the modified data that comprises the confirmation place recognized by the comparison processing unit.

Further features and advantages of the present disclosure will become further apparent from the description of embodiments given below.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION

An embodiment of the present disclosure shall be described below, with reference to FIGS. 1 to 8. Described below, by way of example, is an image formation system 3 comprising a multifunction peripheral 1 (equivalent to an image forming apparatus) and a computer 2 (equivalent to an information processing apparatus). However, the various elements set forth in the present embodiment, such as the configurations and arrangements thereof, are no more than mere examples of description, which do not limit the scope of the disclosure.

(Outline of the Image Formation System 3)

Figure 1:
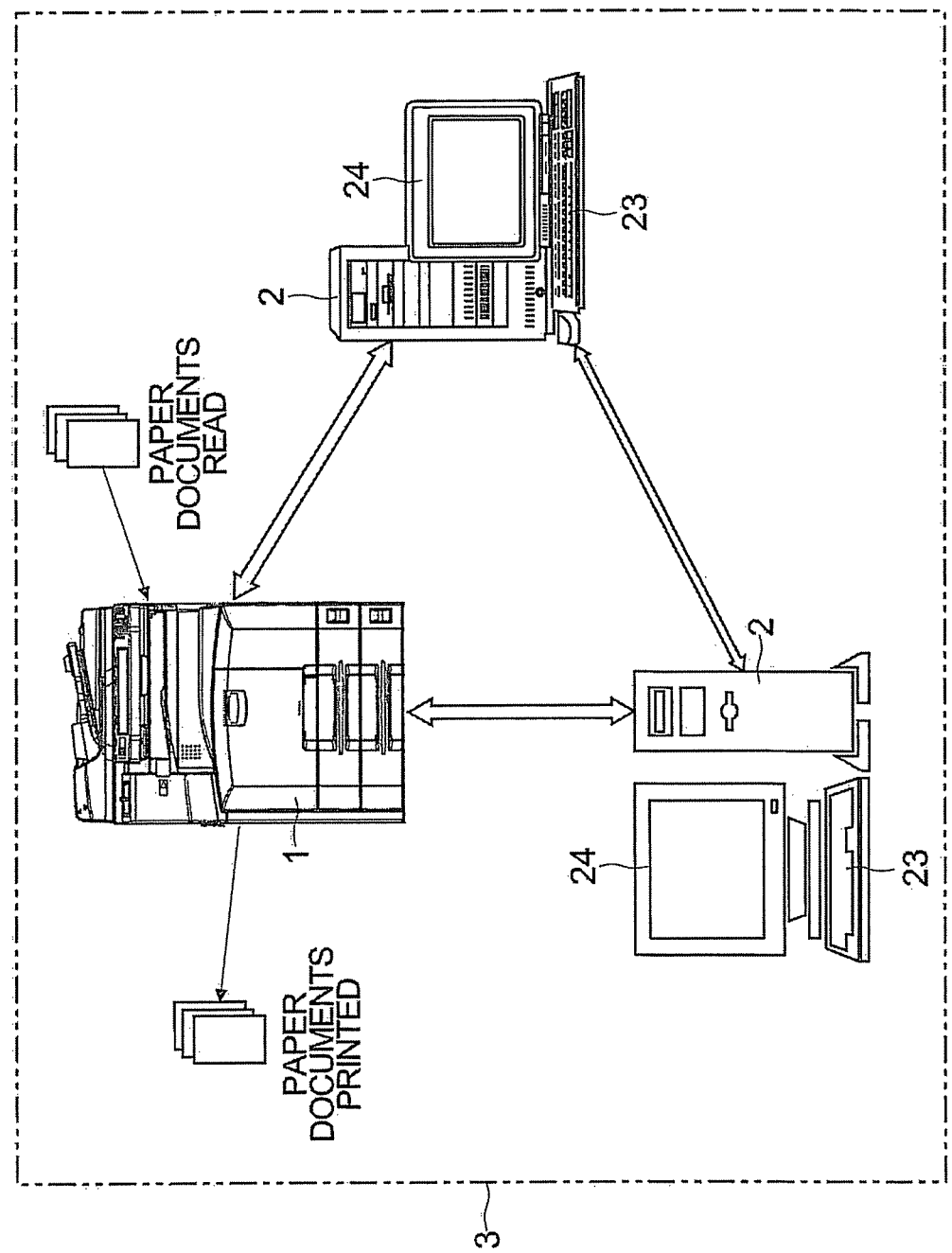
FIG. 1 is a descriptive diagram illustrating an outline of one example of an image formation system.

First, the example of the image formation system 3 as in the embodiment shall be described with reference to FIG. 1. FIG. 1 is a descriptive diagram illustrating an outline of the example of the image formation system 3. FIG. 1 illustrates the flow of data with outlined white arrows.

The image formation system 3 comprises the multifunction peripheral 1 and one or a plurality of computers 2 (for example, a personal computer or server). The multifunction peripheral 1 and the computers 2 are communicatively connected by a network, a cable, or the like.

Driver software for utilizing the multifunction peripheral 1 as a printer is installed on the computers 2. The driver software or a variety of applications (for example, a document authoring application) installed on the computers 2 can be used to designate a document to be printed at the computers 2 or to carry out settings relating to printing such as enlarging or shrinking the paper size.

When the execution of printing is designated with the driver software or the variety of applications, the computers 2 transmit electronic data of the document to be printed by the multifunction peripheral 1 and data relating to the settings of printing, toward the multifunction peripheral 1. The multifunction peripheral 1 receives the data and carries out printing on the basis of the received data.

The multifunction peripheral 1 of the present embodiment also is able to store electronic data of a document received from the computers 2. The multifunction peripheral 1 also reads a document (paper document) and generates image data. The multifunction peripheral 1 can store the generated image data.

(Outline of the Multifunction Peripheral 1)

Figure 2:
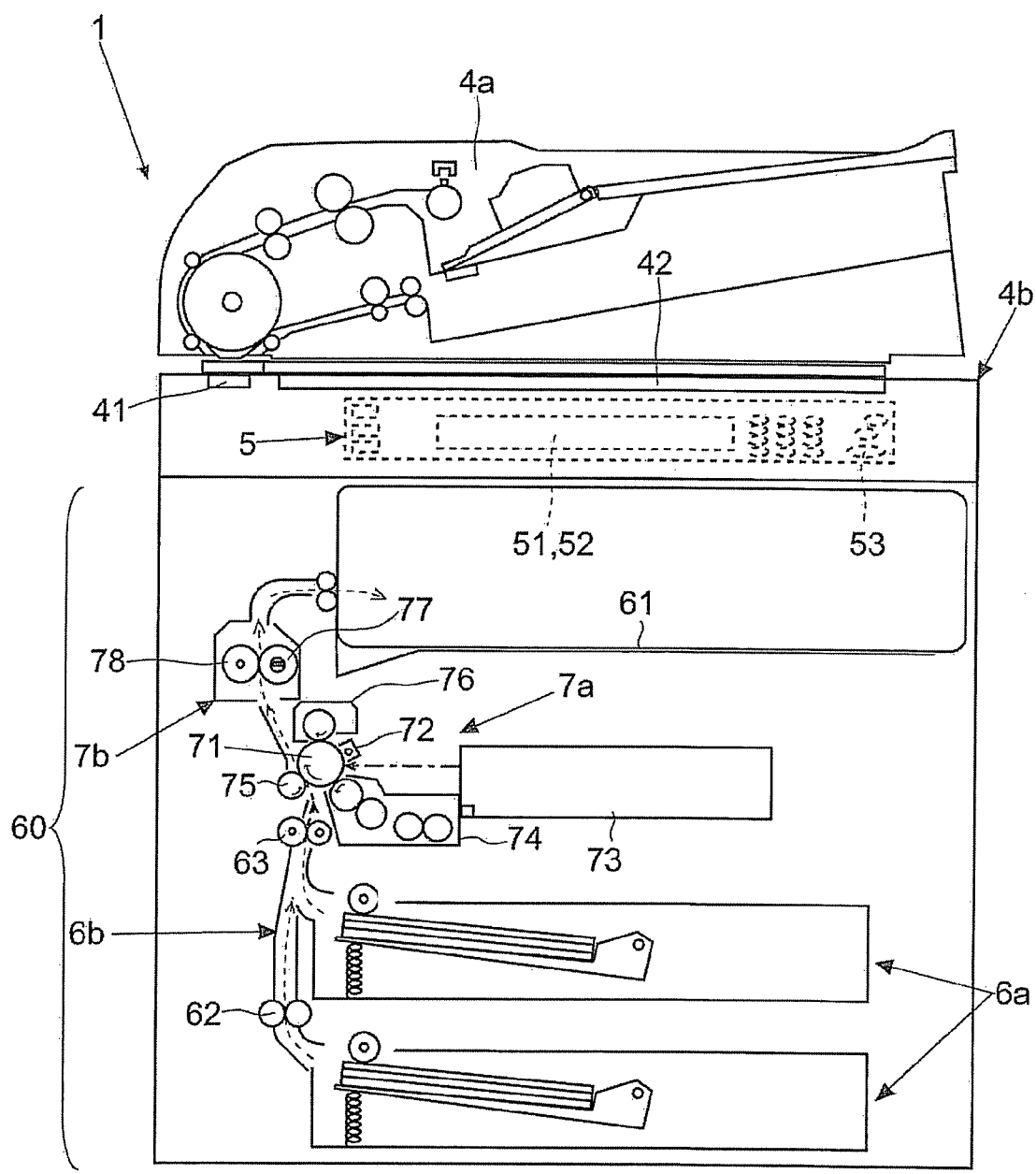
FIG. 2 is a schematic front cross-sectional view illustrating one example of a multifunctional peripheral.

Described next is an outline of the multifunction peripheral 1 as in the embodiment, on the basis of FIG. 2. FIG. 2 is a schematic front cross-sectional view illustrating one example of the multifunctional peripheral 1.

As illustrated in FIG. 2, the multifunction peripheral 1 of the present embodiment has a document conveyance unit 4a at an uppermost part. Further provided, below the document conveyance unit 4a, are an image-reading unit 4b and an operation panel 5 (depicted with a dashed line; equivalent to an input unit). Also provided to the interior of the multifunction peripheral 1 is a printing unit 60 (for example, a paper feed unit 6a, a conveyance unit 6b, an image formation unit 7a, a fixation unit 7b, and the like) for carrying out printing.

As illustrated with the dashed line in FIG. 2, the operation panel 5 is provided to the upper front of the multifunction peripheral 1. The operation panel 5 is provided with a liquid crystal display unit 51 for displaying the status of the multifunction peripheral 1 or a variety of messages. The liquid crystal display unit 51 also displays keys for selecting functions, inputting settings or characters, and the like. A touch panel unit 52 is provided to an upper surface of the liquid crystal display unit 51. The touch panel unit 52 extracts and detects positions and coordinates of portions that are pressed down on at the liquid crystal display unit 51. A pressed key can be recognized on the basis of the output of the touch panel unit 52. Also provided to the operation panel 5 is a hard key, such as a start key 53, for commanding a start of execution of a job for a variety of functions such as copying. A user's input to the operation panel 5 is received using a soft key displayed on the liquid crystal display unit 51 and the hard key provided to the operation panel 5.

The document conveyance unit 4a feeds documents one sheet at a time from a document bundle placed on an upper part of the document conveyance unit 4a, and continuously and automatically conveys the sheets to a feeding and reading contact glass 41 (a read position). The documents are also placed on a placement and reading contact glass 42 and, in order for the placed documents to be pinned down, an end on the front side of the document conveyance unit 4a acts as a free end to enable upward and downward opening and closing.

The image-reading unit 4b reads a document (document) conveyed through the reading contact glass 41 or reads a document placed on the placement and reading contact glass 42, and forms image data about the document. In this manner, with the multifunction peripheral 1 of the present embodiment, it is possible to read a document and generate image data. The image-reading unit 4b of the present embodiment comprises image sensors for the colors R, G, and B, and supports reading in color.

The paper feed unit 6a accommodates a plurality of papers (for example, a variety of sheets such as copy paper, plain paper, recycled paper, cardboard, or OHP sheets), and feeds the paper one sheet at a time to the conveyance unit 6b. The conveyance unit 6b is a route for conveying the paper from the paper feed unit 6a to a paper discharge tray 61. The conveyance unit 6b comprises a conveyance roller pair 62 that are driven to rotate during conveyance of paper, and a resist roller pair 63 that places conveyed paper on standby before the image formation unit 7a and feeds the paper out according to the timing of toner image formation.

The image formation unit 7a forms a toner image on the basis of the image data and transfers the toner image to the paper being conveyed. For toner image formation, the image formation unit 7a comprises a photosensitive drum 71, a charging device 72, an exposure device 73, a developing device 74, a transfer roller 75, and a cleaning device 76.

The fixation unit 7b fixes the toner image transferred to the paper. The fixation unit 7b in the present embodiment comprises a heating roller 77 having a built-in heating element and a pressure roller 78; the heating roller 77 and the pressure roller 78 have pressed contact and form a nip. The passage of the paper through this nip causes the toner on the paper surface to be melted and heated, and causes the toner image to be fixed onto the paper. The paper after toner fixation is discharged to the paper discharge tray 61. In this manner, an image is formed (printed) during usage of the copy function and printer function.

(Hardware Configuration of the Multifunction Peripheral 1)

Figure 3:
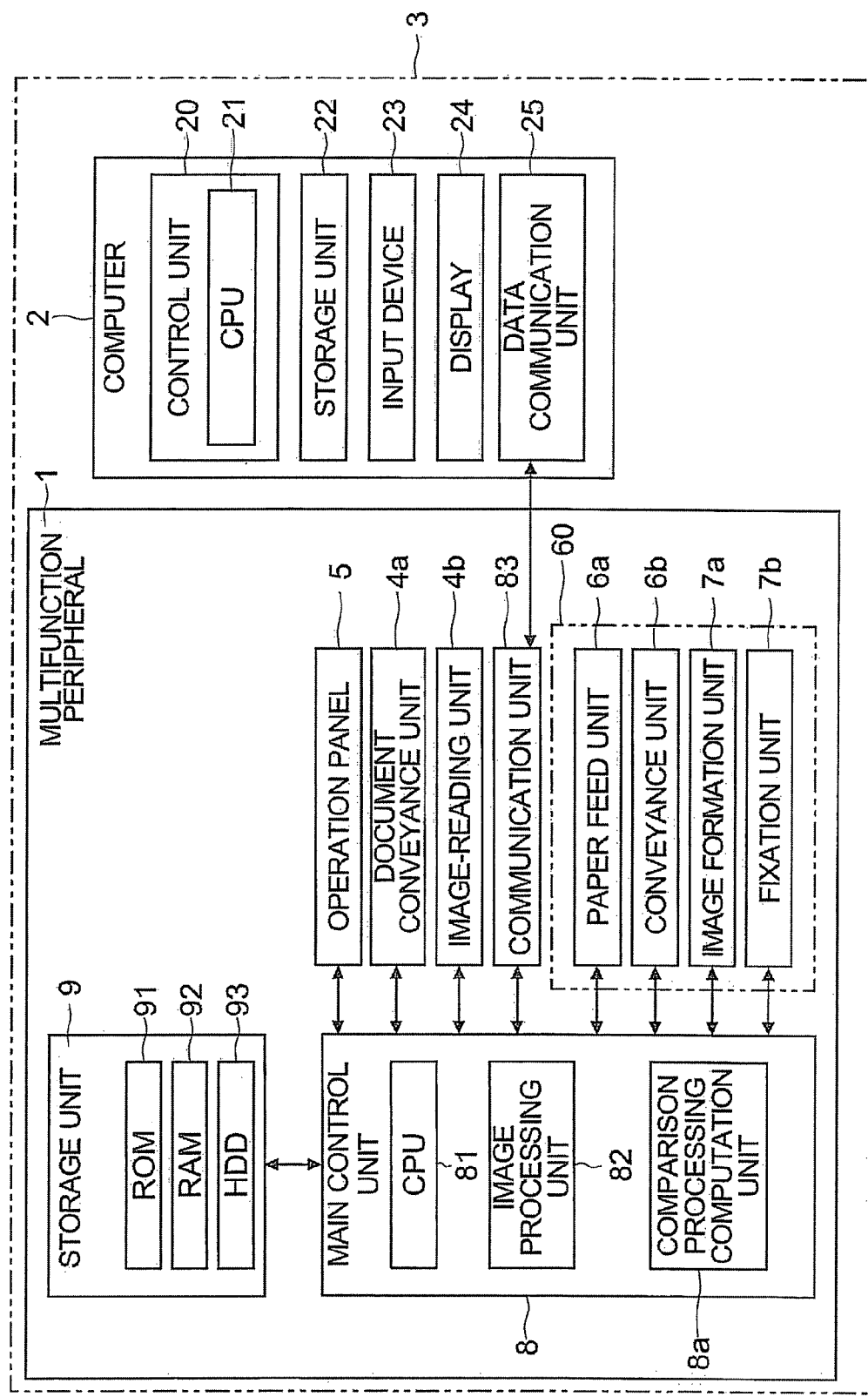
FIG. 3 is a block diagram illustrating one example of a configuration of an image formation system.

Next, one example of the hardware configuration of the image formation system 3 as in the embodiment shall be described on the basis of FIG. 3. FIG. 3 is a block diagram illustrating one example of a configuration of an image formation system 3.

The description shall first proceed from the multifunction peripheral 1. A main control unit 8 (equivalent to a comparison processing unit) is provided inside the multifunction peripheral 1. The main control unit 8 governs the control of the operation of the multifunction peripheral 1. The main control unit 8 comprises a CPU 81, an image processing unit 82, and the like. The main control unit 8 may be divided into respective functions to provide a variety of control units for control, such as a control unit for carrying out overall control and image processing, and a control unit for controlling image formation, the turning on and off of a motor for rotating a variety of rotating bodies, and the like.

The CPU 81 is a central computational processing device. The CPU 81 controls each of the parts of the multifunction peripheral 1 and carries out a variety of computational processes on the basis of programs and data stored in a storage unit 9. The image processing unit 82 carries out processes relating to image data. The image processing unit 82 subjects image data to be printed and image data read at the image-reading unit 4b to image processes such as, for example, density conversion, enlargement, shrinking, and data format conversion.

Also, using the CPU 81 or the image processing unit 82, the main control unit 8 carries out processes for comparing electronic data (hereinafter called "unmodified data 100") indicative of document content authored and modified electronic data (hereinafter called "modified data 140") obtained when the unmodified data 100 is modified; and also for comparing the modified data 140 and scan data 120 (image data obtained by reading a document) (described in greater detail below).

The storage unit 9 comprises a ROM 91, a RAM 92, an HDD 93, and the like, and is a combination of volatile and non-volatile storage devices. The storage unit 9 stores a variety of data such as programs and data for control of the multifunction peripheral 1, setting data and image data. The storage unit 9 also is capable of non-volatile storage and accumulation of the unmodified data 100 and the scan data 120.

The main control unit 8 is connected with a bus, signal line, or the like to the operation panel 5, the document conveyance unit 4a, the image-reading unit 4b, the printing unit 60 (the paper feed unit 6a, the conveyance unit 6b, the image formation unit 7a, and the fixation unit 7b) and the like, to control each of the parts and each of the devices and control the operations of the multifunction peripheral 1 (for example, scan operation and print operation).

Moreover, the main control unit 8 is connected to a communication unit 83 (equivalent to an input unit) provided with a variety of connectors, sockets, and chips for communication control. The communication unit 83 is communicatively connected to a data communication unit 25 of the computers 2 by a network, a public line, a cable, or the like. The communication unit 83 exchanges a variety of data with the computers 2, such as receiving the unmodified data 100 and the modified data 140 from the computers 2.

The computers 2 shall be described next. For example, the computers 2 are personal computers. The computers 2 comprise: the control unit 20 (a substrate) provided with the CPU 21; the storage unit 22 constituted of the HDD, the RAM, and the ROM; an input device 23 such as a keyboard or mouse; a display 24 acting as a display device; and the data communication unit 25, which is an interface for communicating with the exterior.

For example, the control unit 20 is a substrate of the CPU 21 or the like onto which circuitry and chips are mounted. The control unit 20 carries out processes such as computations and controls in the computers 2. The storage unit 22 stores programs and data necessary to operate and utilize the computers 2. Driver software for utilizing the multifunction peripheral 1 is installed in the storage unit 22, as are application programs for authoring, modifying, and the like of electronic data (the unmodified data 100 and modified data 140) about a document.

(Printing Based on the Unmodified Data 100 and Confirmation of the Printout)

Figure 4:
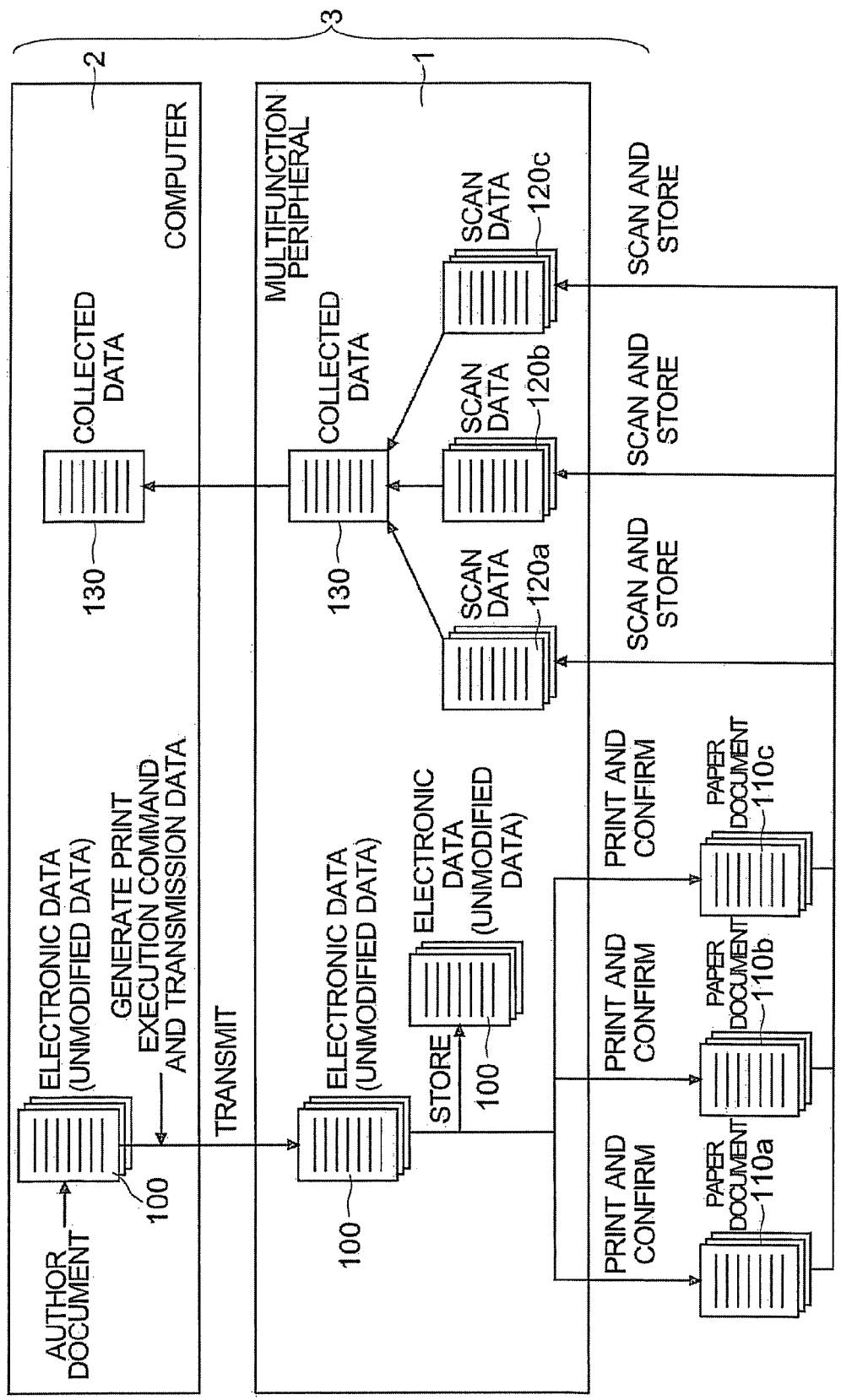
FIG. 4 is a descriptive diagram illustrating an outline of one example of a flow for printing based on unmodified data and confirmation of a printout by a confirmer.

Next, an example of the flow printing based on the unmodified data 100 and for confirming the printout (document) using the multifunction peripheral 1 as in the embodiment shall be described with reference to FIG. 4. FIG. 4 is a descriptive diagram illustrating an outline of one example of the flow for printing based on the unmodified data 100 and confirmation of the printout by a confirmer.

Described below is an example in which three copies are printed and three people A, B, and C confirm printouts based on the electronic data (unmodified data 100). In other words, an example where the three people A, B, and C are understood to be confirmers is described. The person(s) confirming the printed articles based on the unmodified data 100 may be one in number or may be a plurality of persons of a number other than three (for example, two people, or four people, or more).

A document author authors a document using a computer 2. When causing the multifunction peripheral 1 to print the authored document, the document author operates the computer 2. For example, when a command to execute printing of the electronic data (unmodified data 100) indicative of the authored document content is issued with the driver software or in an application, the control unit 20 of the computer 2 generates data to be sent toward the multifunction peripheral 1.

The control unit 20 attaches data relating to the settings (for example, data indicative of the number of copies or the paper size to be used in printing, or the like) in printing set with the driver software or the like, to the unmodified data 100 indicative of the printing content, and generates transmission data to be transmitted to the multifunction peripheral 1. Here, the unmodified data 100 is a file authored by a document authoring application, spreadsheet software, or the like, and is data comprising text data or the like. The control unit 20 of the computer 2 then transmits the unmodified data 100 thus generated from the data communication unit 25 to the multifunction peripheral 1.

In turn, the communication unit 83 of the multifunction peripheral 1 receives the unmodified data 100 (electronic data for printing) coming from the computer 2. In the multifunction peripheral 1 of the present embodiment, the unmodified data 100 received by the communication unit 83 is stored in the storage unit 9. For example, the unmodified data 100 is stored in a non-volatile manner by the HDD 93 of the storage unit 9.

Then, in accordance with the settings, the main control unit 8 (for example, the image processing unit 82) generates image data for printing on the basis of the unmodified data 100. For example, the main control unit 8 generates raster data from text data or the like on the basis of the unmodified data 100. The main control unit 8 (image processing unit 82) also subjects the raster data thus generated to a variety of image processes such as density conversion, and generates image data (data indicative of the turning on and off of a laser) to be used for exposure in the exposure device 73. The image data thus generated in then finally inputted to the exposure device 73.

Then, the main control unit 8 controls the printing unit 60 on the basis of the unmodified data 100 and prints printouts for the confirmer A, for the confirmer B, and for the confirmer C. In FIG. 4, the printout for the confirmer A is depicted as "confirmation document 110a", the printout for the confirmer B is depicted as "confirmation document 110b", and the printout for the confirmer C is depicted as "confirmation document 110c". Each of the confirmers confirms the printouts (texts). Each of the confirmers confirms for points that need to be modified, portions that were of interest, and the like. Each of the confirmers handwrites a commentary onto the printouts of the unmodified data 100. Below, for the sake of convenience, there are some cases where the reference characters "a, b, c" are not appended to the phrase "confirmation document 110."

Next, the main control unit 8 causes the image-reading unit 4b to read the printouts (confirmation document 110) that have been confirmed by each of the confirmers (confirmer A, confirmer B, and confirmer C). The main control unit 8 then causes the image-reading unit 4b to generate the scan data 120, as image data of the printouts (each of the confirmation documents 110). For example, the document author or each of the confirmers sets the confirmation documents 110, onto which the commentaries have been handwritten, on the document conveyance unit 4a. Then, the operation panel 5 receives the pressing down of the start key 53 of the operation panel 5 as a command to execute reading of the documents set thereon.

A notification that the command to execute reading of the documents has been received is transmitted to the main control unit 8 from the operation panel 5. The main control unit 8 receives the command and causes the document conveyance unit 4a to convey the documents one sheet at a time, and causes the image-reading unit 4b to read the documents one sheet at a time and to generate image data about each of the pages. The image data for each of the pages of one confirmer's confirmation document 110 is bundled together (refers to only one page worth of image data when the confirmation document 110 is only one page), and one set of scan data 120 (a bundle of image data of the page(s)) is generated. The image-reading unit 4b generates the scan data 120 for each of the confirmers and the storage unit 9 stores the scan data 120 for each of the confirmers.

In FIG. 4, the scan data 120 of the printout onto which the confirmer A has written a commentary is depicted as "scan data 120a", the scan data 120 of the printout onto which the confirmer B has written a commentary is depicted as "scan data 120b", and the scan data 120 of the printout onto which the confirmer C has written a commentary is depicted as "scan data 120c". Below, for the sake of convenience, there are some cases where the reference characters "a, b, c" are not appended to the phrase "scan data 120", In generating the sets of scan data 120, the operation panel 5 may receive settings for the unmodified data 100 to correspond to the scan data 120 that is to be generated (see FIG. 8). As described above, the storage unit 9 stores the unmodified data 100. Therefore, the operation panel 5 may receive a setting regarding which scan data 120 of the confirmation document 110 is printed on the basis of the unmodified data 100. The storage unit 9 (for example, the HDD 93) then stores data indicative of the correspondences (associations) between the unmodified data 100 and the scan data 120.

When a plurality of persons' confirmation documents 110 are set on the document conveyance unit 4a at one time, then the boundaries between the confirmers are not known, and for this reason, the reading of the confirmation documents 110 and the generation of the image data (scan data 120) are carried out for one confirmer at a time. In other words, the documents are set thereon for one confirmer at a time, and when the reading of one person's document is complete, then another confirmer's document is set thereon, and the reading of the document and generation of the scan data 120 are carried out separately.

The main control unit 8 (image processing unit 82) of the multifunction peripheral 1 also generates collected data 130 obtained by collecting the data indicative of the positions where there is handwritten commentary on the confirmation documents 110 and content thereof for each of the sets of scan data 120, on the basis of one or a plurality of sets of the scan data 120.

There are a variety of methods for processing to extract commented portions P120 from each of the sets of scan data 120, and a known process of extraction can be applied to extract and collect the commented portions P120 from each of the sets of scan data 120. The following refers to one example of a process for extracting and collecting handwritten commented portions P120 from the scan data 120.

First, the unmodified data 100 for printing the confirmation documents 110 is stored in the storage unit 9. Therefore, when the commented portions P120 are being extracted and collected, the main control unit 8 (image processing unit 82) reads the corresponding unmodified data 100 stored in the storage unit 9 and generates image data obtained when the printout of the unmodified data 100 is read, on the basis of the unmodified data 100. For example, the main control unit 8 generates raster data for each of the pages, on the basis of the unmodified data 100. The main control unit 8 then generates image data that approximates the image data obtained when the printout printed on the basis of the unmodified data 100 is read, on the basis of the raster data. For example, the storage unit 9 stores a density conversion table where the print properties or properties of reading by the image-reading unit 4b are considered for each of the pixels of the raster data thus generated, and the main control unit 8 uses the density conversion table to subject each of the pixels of the raster data to a density conversion process and generate image data (hereinafter called "approximate image data") that approximates each of the pages.

Then the main control unit 8 (image processing unit 82) compares the approximate image data and the scan data 120 of the page corresponding thereto (compares an n-th page of the scan data 120 with respect to an n-th page of the unmodified data 100). More specifically, the main control unit 8 compares the pixels values between pixels of corresponding positions in the n-th page of the approximate image data and the image data of the n-th page of the scan data 120.

For example, the confirmers use a mark "○", wavy lines, characters, and the like to handwrite commentary onto the confirmation documents 110. Therefore, the main control unit 8 recognizes the handwritten commented portions P120 to be portions of the scan data 120 where at least a predetermined number of pixels for which the pixel values are different from those of the approximate image data by at least a predetermined threshold value are connected together.

Alternatively, the accuracy of extracting the commented portions P120 from each of the sets of scan data 120 may be increased by writing according to a particular rule onto the printouts of the unmodified data 100. For example, it would be established in advance that commentary for the printout (document) of the unmodified data 100 would be carried out as a handwritten mark "o", wavy line, or specific color (for example, red). Then the main control unit 8 (image processing unit 82) may recognize the handwritten commented portions P120 to be read portions out of the image data of each of the pages of the scan data 120.

Then the main control unit 8 (image processing unit 82) carries on extracting, for each of the portions where there is commentary, the image data of pages comprising the commented portions P120 on the confirmation documents 110 or regions of a certain size (for example, regions of half a page or one quarter of a page) comprising pixels recognized to be portions where there is commentary, out of the image data of each of the pages of the scan data 120. Then the main control unit 8 (image processing unit 82) gathers together the extracted image data in scan data 120 units and generates the collected data 130 obtained by collecting the data indicative of the positions where there is handwritten commentary on the confirmation documents 110 and content thereof. The main control unit 8 may also gather the collected data 130 of each of the plurality of sets of scan data 120 and generate one set of collected data 130.

The main control unit 8 of the multifunction peripheral 1 transmits the collected data 130 thus generated toward the computer 2 that transmitted the unmodified data 100 from the communication unit 83. The storage unit 9 of the multifunction peripheral 1, when storing the unmodified data 100, stores a computer name from which the unmodified data 100 was transmitted, and address information about the computer 2. The communication unit 83 may transmit the collected data 130 to the computer 2 from which the unmodified data 100 was transmitted, on the basis of the stored computer name and address information. Alternatively, when the scan data 120 is being generated, an input setting for the transmission destination of the collected data with the operation panel 5 is received at the operation panel 5. The communication unit 83 then may transmit the collected data 130 to the inputted transmission destination (computer 2).

By confirming the content of the collected data 130, the document author is able to confirm all of the confirmers' commentary. When the content of the collected data 130 is confirmed, it is easy to confirm all of the confirmers' commentary, without flipping one page at a time through all of the confirmers' confirmation documents 110 to confirm commented places P101. Thereafter, it suffices to modify the electronic data of the document (the unmodified data 100).

(Printing Based on the Modified Data 140)

Figure 5:
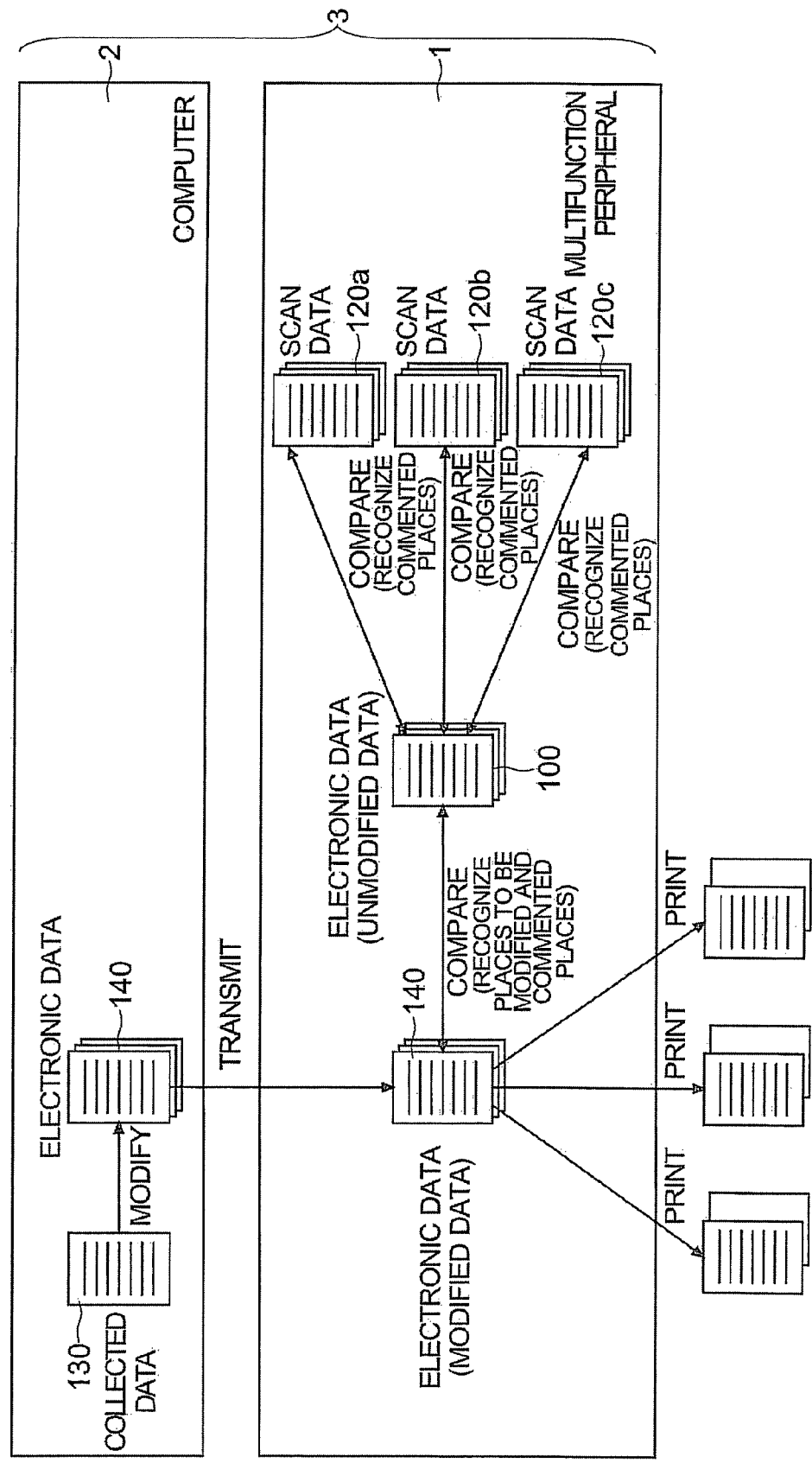
FIG. 5 is a descriptive diagram illustrating one example of a flow for printing based on modified data for confirming commented places.
Figure 6:
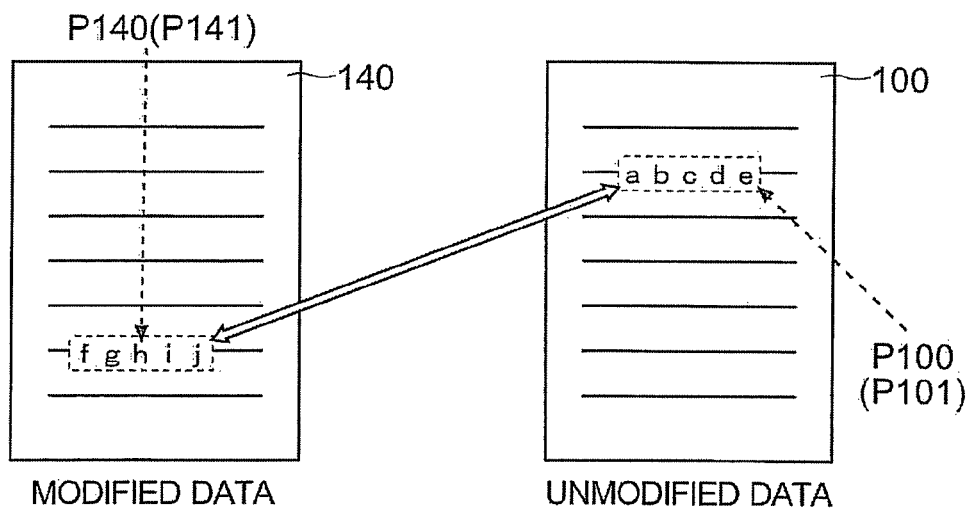
FIG. 6 is a descriptive diagram illustrating one example of a comparison process.
Figure 7:
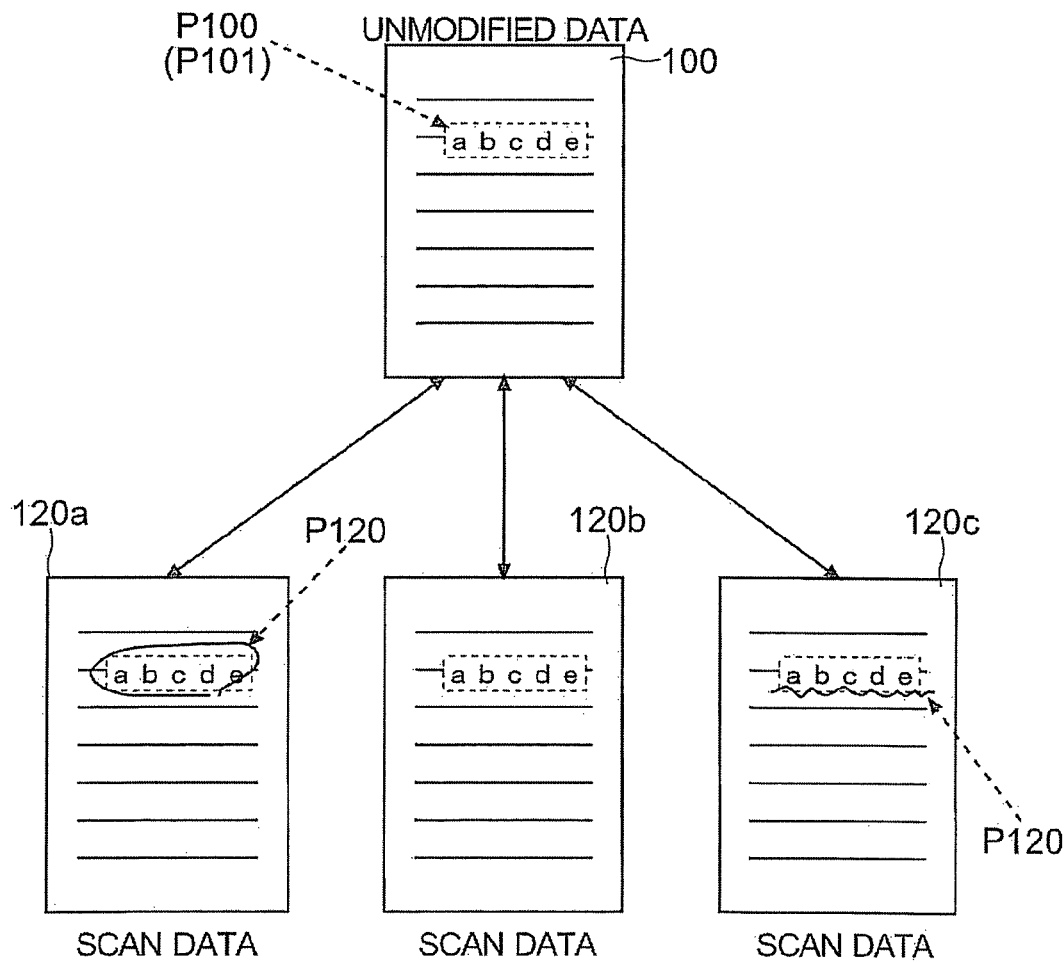
FIG. 7 is a descriptive diagram illustrating one example of a comparison process.

Next, one example of the flow for printing based on the modified data 140 in the multifunction peripheral 1 as in the embodiment shall be described with reference to FIGS. 5 to 7. FIG. 5 is a descriptive diagram illustrating one example of the flow for printing based on the modified data 140 for confirmation of the commented places P101. FIGS. 6 and 7 are descriptive diagrams illustrating one example of a comparison process.

As illustrated in FIG. 5, the document author modifies the electronic data (unmodified data 100) comprising text and the like, using the input device 23 (keyboard, mouse, or the like) of the computer 2. The document author then creates the modified data 140 afresh. At this time, as described above, the document author takes charge of the collected data 130 or the confirmation documents 110 that have been written over, from each of the confirmers, and makes modifications in the light of the charged confirmation documents 110.

Here, when receiving confirmation of whether or not the modifications have been properly carried out from each of the confirmers, it would be very wasteful for the document author to print all of the pages of the modified data 140 in a number of copies commensurate with the number of confirmers. However, the conventional practice has been to print all of the pages of the modified data 140 in a number of copies commensurate with the number of confirmers, because confirmation of the printouts of the modified data 140 is received for all of the confirmers, even when the modified data 140 spans several tens of pages or several hundred pages.

For the confirmers, it suffices to be able to confirm, inter alia, whether modifications have been properly made on the basis of the commentary. For this reason, printing only those pages corresponding to the commented portions out of the pages of the modified data 140 would suffice for each of the confirmers.

However, conventionally, printing only those pages comprising modified places P140 based on the commentary, out of the pages of the modified data 140 has entailed a printing person confirming one page at a time, for each of the pages of the modified data 140, whether the pages include a modified place P140 based on the commentary. Furthermore, the person printing needs to print by designating the pages that comprise the modified places P140, on an application program or the driver program of the multifunction peripheral 1. Because, however, the positions of commentary are different for each of the confirmers and the modifications alter the lines and pages, considerable effort has conventionally been required to print only the necessary pages (pages comprising the modified places P140) for each of the confirmers.

Therefore, in the image formation system 3 and multifunction peripheral 1 of the present embodiment, only those pages that comprise the modified places P140 that have been modified in correspondence with the portions commented on the printouts of the unmodified data 100 (the confirmation documents 110), out of the pages of the modified data 140, are automatically printed. This makes it possible to print only the pages necessary for each of the confirmers and possible to eliminate waste, without burdening a person printing.

When the multifunction peripheral 1 is made to carry out this automatic printing, the document author transmits the modified data 140 to the multifunction peripheral 1. More specifically, the document author operates the computer 2 to carry out a setting for printing in a mode (hereinafter called a "limited printing mode") for printing only the pages necessary for the confirmers, with the driver software or in an application. The operation panel 5 may also receive a setting to execute printing in the limited printing mode (to set the multifunction peripheral 1 to printing in the limited printing mode).

Then, the control unit 20 of the computer 2 generates data to be transmitted toward the multifunction peripheral 1 when there is performed an instruction for causing the multifunction peripheral 1 to print only the pages that comprise the modified places P140 modified according the commentary of each confirmer (for printing in the limited printing mode) on the basis of the modified data 140. More specifically, the control unit 20 attaches data indicating that printing should be done in the limited printing mode, and data (for example, data indicative of the number of copies or the paper size for printing, or the like) pertaining to the settings in printing that have been set with the driver software or the like, to the modified data 140 indicative of the printed content, to generate the data to be transmitted to the multifunction peripheral 1.

Similarly with respect to the unmodified data 100, the modified data 140 also is a file authored by a document authoring application, spreadsheet software, or the like, and is data that comprises text or the like.

Then, the control unit 20 of the computer 2 transmits the modified data 140 and the data comprising the notification that printing should be done in the limited printing mode toward the multifunction peripheral 1 from the data communication unit 25. The communication unit 83 of the multifunction peripheral 1 receives the sets of data. In other words, the communication unit 83 receives the modified data 140, which is electronic data obtained when the unmodified data 100 is modified.

Upon receipt at the communication unit 83, the main control unit 8 of the multifunction peripheral 1 recognizes that printing should be done in the limited printing mode on the basis of the modified data 140. When data indicating that the printing should be done in the limited printing mode is not attached, then the main control unit 8, for example, causes the printing unit 60 to print all of the pages of the modified data 140, in accordance with the settings.

When printing is being carried out in the limited printing mode, the main control unit 8 of the multifunction peripheral 1 compares the unmodified data 100 and the modified data 140, and recognizes places to be modified P100, which are places that were modified in the unmodified data 100, and the modified places P140, which are places that have been modified in the modified data 140.

Therefore, the recognition of the places to be modified P100 in the unmodified data 100 and the modified places P140 in the modified data 140 shall be described, with reference to FIG. 6. First, as described above, the unmodified data 100 and the modified data 140 are both data comprising information having a specific meaning due to the arrangement of a plurality of portions (characters, numbers, symbols, and the like), as with text data. For this reason, places that differ between the unmodified data 100 and the modified data 140 (portions where the data is difference) are places relating to modification.

For example, in FIG. 6, on a given page, the unmodified data 100 sets forth "abcde" and the modified data 140 sets forth "fghij", and different strings are indicated. Portions of difference between the unmodified data 100 and the modified data 140 are thus places to be modified P100 (portions that were modified) in the unmodified data 100 and modified places P140 (portions that have been modified) in the modified data 140.

In turn, portions that were not modified (for example, portions before and after the "abcde" or "fghij") are consistent between the unmodified data 100 and the modified data 140. For example, a plurality of characters of text data is consistent before and after the different portions. For this reason, the main control unit 8 can determine portions that are without modification, and does not recognize portions that are without modification as being the modified places P140 or places to be modified P100.

Thus, the main control unit 8 can readily recognize the differences between the unmodified data 100 and the modified data 140 even when the modification causes a deviation in the lines or pages. The main control unit 8 then recognizes the different portions as being the places to be modified P100 in the unmodified data 100, and recognizes the modified places P140 in the modified data 140.

Moreover, during printing in the limited printing mode, the main control unit 8 of the multifunction peripheral 1 compares the unmodified data 100 and the scan data 120 of each of the confirmers, and recognizes the commented places P101 in the unmodified data 100. Therefore, the recognition of the commented places P101 in the unmodified data 100 shall now be described, with reference to FIG. 7.

First, the scan data 120 is obtained by reading the printouts based on the unmodified data 100, and thus the content of each of the pages of the unmodified data 100 and the content of each of the pages of the scan data 120 are essentially the same (should be the same, except for the commented places P101). For example, as illustrated in FIG. 7, the unmodified data 100 and the scan data 120 are consistent in terms of the positions of rows and columns in the written content, the positions of the pages, and the number of pages.

The content of each of the pages of the scan data 120 and the content of each of the pages of the unmodified data 100 differ in that the handwritten commentary has been written over onto the scan data 120. Therefore, the main control unit 8 recognizes the positions of the handwritten commented portions P120 inside the scan data 120 on the basis of this difference. The main control unit 8 recognizes the same positions in each of the pages of the unmodified data 100 as the positions of the recognized commented portions P120 in the scan data 120, as being the commented places P101 in the unmodified data 100.

Here, there are a variety of techniques for recognizing the commented portions P120 in the scan data 120. For example, similarly with respect to when the collected data 130 is authored, the main control unit 8 (image processing unit 82) reads out the unmodified data 100 that is stored in the storage unit 9 and corresponds to the scan data 120, and generates image data obtained when the printout of the unmodified data 100 is read, on the basis of the unmodified data 100. For example, the main control unit 8 generates raster data for each of the pages, on the basis of the unmodified data 100. The main control unit 8 then generates image data that approximates the image data obtained when the printout printed on the basis of the unmodified data 100 is read, on the basis of the raster data. For example, the storage unit 9 stores a density conversion table where the print properties or properties of reading by the image-reading unit 4b are considered for each of the pixels of the raster data thus generated, and the main control unit 8 uses the density conversion table to subject each of the pixels of the raster data to a density conversion process and generate image data (hereinafter called "approximate image data") that approximates each of the pages.

Then the main control unit 8 (image processing unit 82) compares the approximate image data and the scan data 120 of the page corresponding thereto (compares an n-th page of the scan data 120 with respect to an n-th page of the unmodified data 100). More specifically, the main control unit 8 compares the pixels values between pixels of corresponding positions in the n-th page of the approximate image data and the image data of the n-th page of the scan data 120.

For example, the confirmers use a mark "○", wavy lines, characters, and the like to handwrite commentary onto the confirmation documents 110. Therefore, the main control unit 8 recognizes the handwritten commented portions P120 to be portions of the scan data 120 where at least a predetermined number of pixels for which the pixel values are different from those of the approximate image data by at least a predetermined threshold value are connected together.

Alternatively, the accuracy of extracting the commented portions P120 from each of the sets of scan data 120 may be increased by writing according to a particular rule onto the printouts of the unmodified data 100. For example, it would be established in advance that commentary for the printout (document) of the unmodified data 100 would be carried out a handwritten mark "○", wavy line, or specific color (for example, red). Then the main control unit 8 (image processing unit 82) may recognize the handwritten commented portions P120 to be read portions out of the image data of each of the pages of the scan data 120.

When a process similar to during the generation of the collected data 130 is carried out, the storage unit 9 may store (may retain) the collected data 130 and data indicative of the commented portions P120 for each of the sets of scan data 120 recognized in the creation of the collected data 130. In such a case, the main control unit 8 could utilize the results from the unmodified data 100 and scan data 120 already having been compared and processed, to recognize the commented places P101 (portions corresponding to the commented portions P120) in the unmodified data 100.

The main control unit 8 recognizes the positions of the commented portions P120 in the scan data 120, and also recognizes the corresponding positions in the unmodified data 100 as being the commented places P101. In other words, the main control unit 8 recognizes the commented places P101 in the unmodified data 100 on the basis of the results of recognizing the commented positions in the scan data 120. In this manner, the main control unit 8 recognizes the commented places P101 by comparing the original unmodified data 100 and the scan data 120, and therefore the commented places P101 in the unmodified data 100 can be accurately recognized.

When there are a plurality of sets of scan data 120 based on confirmation documents 110 (paper documents) of the same content, then the main control unit 8 recognizes the commented places P101 in the unmodified data 100 for each of the sets of scan data 120.

The main control unit 8 then recognizes portions that are both commented places P101 and places to be modified P100 in the unmodified data 100. The main control unit 8 than recognizes the places in the modified data 140 that correspond to places are both commented places P101 and places to be modified P100 as being confirmation places P141, on the basis of the results of recognizing the relationships of correspondence between the modified places P140 and the places to be modified P100. In other words, the main control unit 8 follows the places to be modified P100 in the unmodified data 100 to arrive at the confirmation places P141 in the modified data 140.

Then, the main control unit 8 carries out a control for printing only those pages of the modified data 140 where the confirmation places P141 are written. More specifically, the main control unit 8 (image processing unit 82) generates raster data for only the pages where the confirmation places P141 are written, and carries out image processing in accordance with the settings to output image data to the exposure device 73. The main control unit 8 (CPU 81 or the like) controls the printing unit 60 to cause the printing unit 60 to print only those pages where the confirmation places P141 are written (to print in the limited printing mode).

When there are a plurality of sets of the scan data 120 based on confirmation documents 110 (unmodified data 100) of the same content, then the main control unit 8 recognizes the confirmation places P141 for each of the sets of scan data 120. The main control unit 8 then prints only those pages of the modified data 140 where the confirmation places P141 are written (pages that include the confirmation places P141) for each of the sets of scan data 120 (for each of the confirmers).

For example, in the example in FIG. 7, commentary is handwritten at the "abode" portion, as evidenced by the scan data 120a of the confirmer A and the scan data 120c of the confirmer C. When the "fghij" portion in the modified data 140 is a confirmation place P141, corresponding to the "abcde" portion in the unmodified data 100, then the page where the "fghij" portion is written is printed for the confirmer A and the confirmer C, on the basis of the modified data 140.

In turn, in the example in FIG. 7, the confirmer B has not commented on the "abcde" portion, as evidenced by the scan data 120b of the confirmer B. For this reason, though the "fghij" portion has been modified in the modified data 140, corresponding to the "abcde" portion in the unmodified data 100, the page where the "fghij" portion is written (the page without commentary) is not printed for the confirmer B.

(Identification of the Scan Data 120 and Unmodified Data 100 in the Limited Printing Mode)

Figure 8:
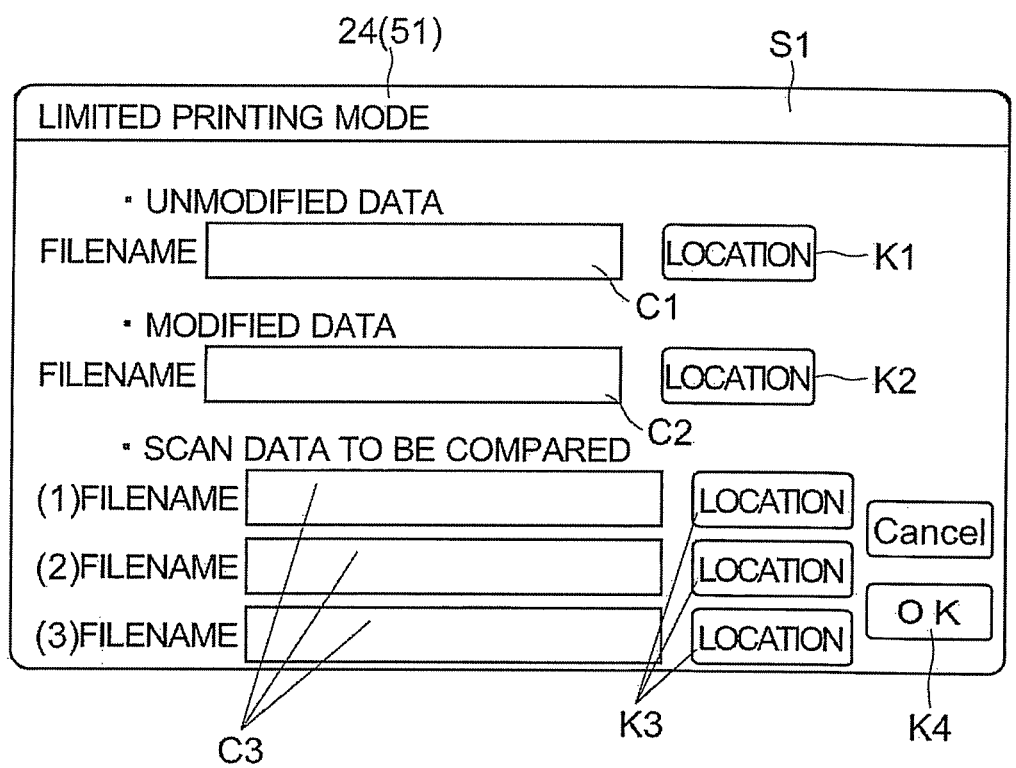
FIG. 8 is a descriptive diagram illustrating one example of a setting screen in a limited printing mode.

Next, the identification of the scan data 120 and the unmodified data 100 used in the limited printing mode shall be described, with reference to FIG. 8. FIG. 8 is a descriptive diagram illustrating one example of a setting screen S1 in the limited printing mode.

As described above, the multifunction peripheral 1 of the present embodiment stores the unmodified data 100 that was received and the image data obtained in the reading by the image-reading unit 4b, as the scan data 120. The storage unit 9 is able to store a plurality of types of unmodified data 100 and a plurality of types of scan data 120.

When the modified data 140 is transmitted, the unmodified data 100 that corresponds to the modified data 140 can be automatically discovered. For example, the main control unit 8 can compare between the two sets of electronic data of the unmodified data 100 and the modified data 140 and recognizes the unmodified data 100 having the highest rate of concordance with the modified data 140, out of the unmodified data 100 that is stored in the storage unit 9, as being the unmodified data 100 that corresponds to the modified data 140 received.

When the corresponding unmodified data 100 can be automatically discovered, the main control unit 8 can either compare the raster data based on the unmodified data 100 and the scan data 120 or refer to data indicative of the relationship with the unmodified data 100 at the generation of the scan data 120, to discover the scan data 120 that corresponds to the modified data 140.

However, the processing load for the main control unit 8 is considerable when the main control unit 8 carries out processing for matching the relationship of correspondence to all of the types of unmodified data 100 stored in the storage unit 9 every time the modified data 140 is received. Also, the processing load for the main control unit 8 is considerable in a case where there is a large amount of data in the unmodified data 100 or in a case where a large number of sets of unmodified data 100 are stored in the storage unit 9.

Therefore, in the image formation system 3 and multifunction peripheral 1 of the present embodiment, the limited printing mode can be executed with settings for the unmodified data 100 and the scan data 120 corresponding to the modified data 140.

FIG. 8 illustrates one example of a setting screen for setting the data (file) used in the limited printing mode. For example, operating an application software or driver software makes it possible to cause the display 24 of the computer 2 to display the setting screen S1.

On the setting screen S1, the unmodified data 100, modified data 140, and scan data 120 used in the limited printing mode can be identified (designated). Provided to the setting screen S1 is an unmodified data display column C1 for displaying the storage location and filename of the unmodified data 100 used in the limited printing mode. A location key K1 is provided to the right side of the unmodified data display column C1. When the location key K1 is pressed with a mouse or the like, the control unit displays 20 a hierarchy of folders and directories inside the multifunction peripheral 1 and the filenames stored in the folders. Operating the mouse or keyboard then allows the user to cause the display 24 to display the storage location of the desired unmodified data 100. An operation where the mouse or keyboard is operated to identify the desired file (unmodified data 100) is received at the input device 23 of the computer 2 as an operation for setting the unmodified data 100.

Also provided to the setting screen S1 is a modified data display column C2 for displaying the storage location and filename of the modified data 140 used in the limited printing mode. A location key K2 is provided to the right side of the modified data display column C2. When the location key K2 is pressed with a mouse or the like, the control unit 20 displays a hierarchy of folders and directories inside the computer 2 and the filenames stored in the folders. Operating the mouse or keyboard then allows the user to cause the display 24 to display the storage location of the desired modified data 140. An operation where the mouse or keyboard is operated to identify the desired file (modified data 140) is received at the input device 23 of the computer 2 as an operation for setting the modified data 140.

Also provided to the setting screen S1 are a plurality of scan data display columns C3 for displaying the storage location and filename of the scan data 120 used in the limited printing mode. Location keys K3 are provided to the right sides of each of the scan data display columns C3. When the location keys K3 are pressed with a mouse or the like, the control unit 20 displays a hierarchy of folders and directories inside the multifunction peripheral 1 and the filenames stored in the folders. Operating the mouse or keyboard then allows the user to cause the display 24 to display the storage location of the desired scan data 120. An operation where the mouse or keyboard is operated to identify the desired file (scan data 120) is received at the input device 23 of the computer 2 as an operation for setting the unmodified data 100.

When an OK key K4 is pressed, the setting screen S1 is closed, and the settings for the unmodified data 100, the modified data 140, and the scan data 120 used in the limited printing mode are accepted. The communication unit 25 of the computer 2 then transmits, to the communication unit 83 of the multifunction peripheral 1, data indicative of the storage positions of the set (identified) unmodified data 100 and scan data 120 inside the multifunction peripheral 1, as well as the modified data 140 and data indicating that printing is to be carried out in the limited printing mode. For this reason, the communication unit 83 of the multifunction peripheral 1 functions as an input unit for accepting the setting input for the unmodified data 100 and scan data 120 used in the limited printing mode.

The description above relates to an example where the setting screen Si is displayed on the computers 2, but the setting screen may be displayed on (the liquid crystal display unit 51 of) the operation panel 5 of the multifunction peripheral 1. In such a case, the operation panel 5 functions as the input unit for accepting the setting input for the unmodified data 100, the modified data 140, and the scan data 120 used in the limited printing mode.

In this manner, the image forming apparatus (multifunction peripheral 1) of the present embodiment comprises: a communication unit 83 for receiving electronic data for carrying out printing from an external source, and receiving unmodified data 100, which is unmodified electronic data, and modified data 140, which is electronic data obtained when the unmodified data 100 is modified; a printing unit 60 for printing on the basis of the unmodified data 100 and the modified data 140; an image-reading unit 4b for reading a confirmation document 110, which is a printout based on the unmodified data 100 which has been confirmed by a confirmer and over which a commentary has been written, and generating scan data 120 as image data; a storage unit 9 for storing the unmodified data 100, the modified data 140, and the scan data 120; and a comparison processing unit (main control unit 8) for comparing the unmodified data 100, the modified data 140, and the scan data 120 stored in the storage unit 9, and recognizing a confirmation place P141, which is a modified place P140 that has been modified from the unmodified data 100 in correspondence with the commentary, out of the modified data 140; the printing unit 60 printing only the page of the modified data 140 that comprises the confirmation place P141 recognized by the comparison processing unit.

This causes only the page among the pages of the modified data 140 that have writing (the confirmation place P141) corresponding to the place where there was commentary in the unmodified document to be printed. As such, the confirmers need not seek out the places that have been commented or places (pages) that have been modified one by one from among all of the pages of the modified data 140. Also, the confirmers can confirm the modified data 140 merely by confirming the page that comprises the confirmation place P141 and has been printed. The task of confirming the printout of the modified document can then be smoothly carried out. Moreover, confirming the document need not involve printing all of the pages of the modified data 140, and thus the printing of pages unnecessary for confirmation can be prevented, and waste of paper, energy, and time can be eliminated. Also, only the page that comprises the confirmation place P141 can be automatically printed, without the task of confirming one by one in the unmodified data 100 or scan data 120 for which page of the modified data 140 comprises the confirmation place P141. As such, the person printing need not carry out the task of choosing the page that comprises the confirmation place P141 from among the modified data 140.

Also, the comparison processing unit (main control unit 8) compares the unmodified data 100 and the scan data 120 and recognizes the commented place P101 in the unmodified data 100 corresponding to portions where there is commentary in the scan data 120, and also compares the unmodified data 100 and the modified data 140 and recognizes the place to be modified P100 in the unmodified data 100 and the modified place P140 corresponding to the place to be modified P100 in the modified data 140, and recognizes, as being the confirmation place P141, the place in the modified data 140 that is both the commented place P101 in the unmodified data 100 and also the modified place P140 corresponding to the recognized place to be modified P100. This makes it possible to focus on the different parts of the unmodified data 100 and scan data 120 and to accurately recognize the positions of the commented place P101 in the unmodified data 100. Comparing the unmodified data 100 and the modified data 140, which are similar data, and recognizing the differences enables the comparison processing unit to accurately recognize the modified place P140 in the modified data 140 and the place to be modified P100 in the unmodified data 100 that correspond to the modified place P140. Because the confirmation place P141 is recognized with the commented place P101, the place to be modified P100, and the modified place P140 having been accurately recognized, it is possible to accurately print only the page of the modified data 140 that should be confirmed due to the modifications.

The storage unit 9 stores a scan data for a plurality of individuals 120, and the comparison processing unit (main control unit 8) recognizes the confirmation place P141 for each of the confirmers; the printing unit 60 prints the page comprising the confirmation place P141 for each of the confirmers, on the basis of the confirmation place P141 recognized by the comparison processing unit (main control unit 8). This makes it possible, even when there are a plurality of confirmers, to print the page necessary in confirming the modified data 140 for each of the confirmers. As such, with a plurality of confirmers, each of the confirmers is still able to print only the page necessary for confirmation after modification, so as to be able to smoothly carry out the task of confirming the printout of the modified document. There is no need to print all of the pages of the modified data 140 for each of the confirmers. Moreover, each of the confirmers is able to complete the confirmation of the place where there are modifications in little time.

Also included is an input unit (communication unit 83, operation panel 5, and the like) for identifying the unmodified data 100 and scan data 120 to be used out of the unmodified data 100 and scan data 120 that are stored in the storage unit 9 when only the page of the modified data 140 that comprises the confirmation place P141 is being printed. This makes it possible to compare the desired unmodified data 100 and scan data 120 and the modified data 140.

The communication unit 83 transmits, to an information processing apparatus (computer 2) for authoring the modified data 140, collected data 130, obtained by collecting data indicative of the positions and comments of the commentary of individual sets of scan data for a plurality of individuals 120. This allows the document author, even when there are a plurality of confirmers, to refer to the collected data 130 and modify the document without omission. The document author is also able to accurately modify the document even when the printouts confirmed by the confirmers are not at hand.

The unmodified data 100 and the modified data 140 are data that comprises text data. This makes it possible for the comparison processing unit (main control unit 8) to contrast the text data against each other and accurately recognize the modified place P140 in the modified data 140 and the place to be modified P100 in the unmodified data 100.

The image formation system 3 comprises the above-described image forming apparatus (multifunction peripheral 1), and an information processing apparatus (computer 2) for communicating with the image forming apparatus and transmitting the unmodified data 100 and the modified data 140. With the image formation system 3, it is possible to print only the page for which confirmation is necessary in order to modify at the image forming apparatus (multifunction peripheral 1), and possible to modify the document data at the information processing apparatus (computer 2). As such, it is possible to provide an image formation system 3 that is easy to use.

The comparison processing unit (main control unit 8) recognizes the difference between the unmodified data 100 and the modified data 140, recognizes the different portion as being the place to be modified P100 in the unmodified data 100, and recognizes same as being the modified place P140 in the modified data 140. The unmodified data 100 and the modified data 140 are similar data, and thus it is possible to correctly recognize the different portions and to accurately recognize the place to be modified P100 and the modified place P140. As such, the confirmation place is accurately recognized.

The comparison processing unit (main control unit 8) compares the unmodified data 100 and the scan data 120, extracts, as the commented portions P120 from the scan data 120, portions that have been written according to a particular rule over the printout of the unmodified data 100, and recognizes the corresponding positions in the unmodified data 100 as being the commented place P101. This makes it possible to improve the accuracy of extracting the commented portions P120 from each of the sets of scan data 120.

Other embodiments shall now be described. The embodiment described above describes an example where the main control unit 8 carries out a variety of comparisons to recognize the places to be modified P100, the modified places P140, and the commented places P101. However, as illustrated in FIG. 3, there may be provided a dedicated portion or dedicated circuit (depicted as the comparison processing computation unit 8a in FIG. 3) for carrying out processing and computation for carrying out a variety of comparisons to recognize the places to be modified P100, the modified places P140, and the commented places P101. This dedicated circuit may be provided outside the main control unit 8.

Embodiments of the present disclosure have been described, but the scope of the present disclosure is not limited thereto, but rather a variety of modifications can be additionally carried out within a scope that does not depart from the spirit of the disclosure.

The present disclosure can be used for an image forming apparatus, or an image formation system comprising an image forming apparatus and an information processing apparatus. The present disclosure can also be regarded as being a method.

What is claimed is:

1. An image forming apparatus, comprising:
    a communication unit for receiving from an external source electronic data for printing, and receiving unmodified data, which is unmodified electronic data, and modified data, which is electronic data obtained when the unmodified data is modified;
    an image-reading unit for reading a confirmation document, which is a printout based on the unmodified data, the confirmation document being confirmed by one of a plurality of confirmers and being overwritten with commentary; and generating scan data to serve as image data;
    a storage unit for storing the unmodified data, the modified data, and the scan data;
    a comparison processing unit for comparing the unmodified data, the modified data, and the scan data stored in the storage unit, and recognizing a confirmation place in the modified data, which is a modified place that has been modified from the unmodified data in correspondence with the commentary;
    a printing unit for printing; and
    an input unit for identifying the unmodified data and scan data to be used out of the unmodified data and scan data that are stored in the storage unit when only the page of the modified data that is overwritten with a comment by a corresponding one of the confirmers and that comprises the confirmation place is being printed,
    wherein
    the storage unit stores the scan data of printouts which the printing unit printed for different confirmers based on the unmodified data and which are overwritten with comments by the different confirmers,
    the comparison processing unit recognizes out of the modified data, based on the confirmation place, a page that is overwritten with a comment by the confirmer corresponding to the scan data and that is modified based on the comment, generates, based on each of the sets of scan data, a set of collected data by collecting data indicative of positions where there is a comment by one of the confirmers on the confirmation documents and content thereof, and makes the communication unit transmit the generated collected data to a computer from which the unmodified data was received; and the printing unit prints, out of the modified data, only the page that is overwritten with a comment by a corresponding one of the confirmers and that is modified based on the comment.

2. The image forming apparatus as set forth in claim 1, the comparison processing unit comparing the unmodified data and the scan data and recognizing a commented place in the unmodified data corresponding to a portion where there is commentary in the scan data, comparing the unmodified data and the modified data and recognizing a place to be modified, which is a place that was modified in the unmodified data, and a modified place corresponding to the place to be modified in the modified data, and further recognizing as the confirmation place, for the corresponding confirmer, the place in the modified data that is both the commented place in the unmodified data and also the modified place corresponding to the recognized place to be modified.

3. The image forming apparatus as set forth in claim 2, the comparison processing unit recognizing a difference between the unmodified data and the modified data, recognizing a different portion as the place to be modified in the unmodified data, and as the modified place in the modified data.

4. The image forming apparatus as set forth in claim 2, the comparison processing unit comparing the unmodified data and the scan data, extracting, as the commented portions from the scan data, portions that have been written according to a particular rule over the printout of the unmodified data, and recognizing the corresponding positions in the unmodified data as the commented place.

5. An image formation system, comprising the image forming apparatus as set forth in claim 2, and an information processing apparatus for communicating with the image forming apparatus and transmitting the unmodified data and the modified data.

6. The image forming apparatus as set forth in claim 1, the unmodified data and the modified data being data that comprises text data.

7. An image formation system, comprising the image forming apparatus as set forth in claim 1, and an information processing apparatus for communicating with the image forming apparatus and transmitting the unmodified data and the modified data.

8. A method for controlling an image forming apparatus, the method comprising the following steps:

receiving electronic data for printing from an external source;

receiving unmodified data, which is unmodified electronic data, and modified data, which is electronic data obtained when the unmodified data is modified;

reading a confirmation document, which is a printout based on the unmodified data, for each of a plurality of confirmers, each confirmation document being confirmed by a corresponding one of the confirmers, and being overwritten with commentary; and generating scan data to serve as image data;

storing the unmodified data, the modified data, and the scan data;

comparing the unmodified data, the modified data, and the scan data thus stored, and thereby recognizing a confirmation place in the modified data, for each corresponding confirmer, which is a modified place that has been modified from the unmodified data in correspondence with the commentary;

printing on the basis of the unmodified data and the modified data;

printing only the page of the modified data that comprises the recognized confirmation place for the corresponding confirmer; and accepting an input for identifying the unmodified data and the scan data to be used out of the stored unmodified data and the scan data when only the page of the modified data that comprises the confirmation place, for the corresponding confirmer, is printed;

recognizing out of the modified data, based on the confirmation place, a page that is overwritten with a comment by the confirmer corresponding to the scan data and that is modified based on the comment;

generating, based on each of the sets of scan data, a set of collected data by collecting data indicative of positions where there is a comment by one of the confirmers on the confirmation documents and content thereof, and transmitting the generated collected data to a computer from which the unmodified data was received; and printing, out of the modified data, only the page that is overwritten with a comment by a corresponding one of the confirmers and that is modified based on the comment.

9. The method for controlling an image forming apparatus as set forth in claim 8, comprising:

comparing the unmodified data and the scan data and thereby recognizing a commented place in the unmodified data corresponding to the portion where there is commentary in the scan data, comparing the unmodified data and the modified data and thereby recognizing a place to be modified, which is a place that was modified in the unmodified data, and a modified place corresponding to the place to be modified in the modified data; and recognizing, as the confirmation place, for the corresponding confirmer, the place in the modified data that is both the commented place in the unmodified data and also the modified place corresponding to the recognized place to be modified.

10. The method for controlling an image forming apparatus as set forth in claim 9, comprising:

recognizing a difference between the unmodified data and the modified data, and recognizing a different portion as being the place to be modified in the unmodified data, and as the modified place in the modified data.

11. The method for controlling an image forming apparatus as set forth in claim 9, comprising:

comparing the unmodified data and the scan data, extracting, as the commented portions from the scan data, portions that have been written according to a particular rule over the printout of the unmodified data, and recognizing the corresponding positions in the unmodified data as the commented place.

12. The method for controlling an image forming apparatus as set forth in claim 8, comprising:

transmitting, to an information processing apparatus for authoring the modified data, collected data obtained by collecting data indicative of positions and comments of the commentary of each set of the scan data for the corresponding confirmer.

13. The method for controlling an image forming apparatus as set forth in claim 8,
the unmodified data and the modified data being data that comprises text data.

* * * * *